(12) United States Patent
Huang

(10) Patent No.: US 8,721,083 B2
(45) Date of Patent: May 13, 2014

(54) POLARIZATION CONVERSION SYSTEM AND STEREOSCOPIC PROJECTION SYSTEM EMPLOYING SAME

(75) Inventor: June-Jei Huang, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 290 days.

(21) Appl. No.: 13/190,701

(22) Filed: Jul. 26, 2011

(65) Prior Publication Data

US 2012/0057134 A1   Mar. 8, 2012

Related U.S. Application Data

(60) Provisional application No. 61/380,552, filed on Sep. 7, 2010.

(51) Int. Cl.
G02B 27/26 (2006.01)
G02B 27/28 (2006.01)

(52) U.S. Cl.
USPC ............... 353/7; 353/8; 353/20; 359/485.01; 359/485.05

(58) Field of Classification Search
USPC ............. 353/20, 7, 8, 30, 31, 37, 38, 98, 122; 359/485.01, 485.05, 485.06, 485.07
See application file for complete search history.

(56) References Cited

U.S. PATENT DOCUMENTS

| 7,857,455 | B2 * | 12/2010 | Cowan et al. | 353/20 |
| 7,862,182 | B2 * | 1/2011 | Thollot et al. | 353/84 |
| 7,959,296 | B2 * | 6/2011 | Cowan et al. | 353/20 |
| 8,220,934 | B2 * | 7/2012 | Schuck et al. | 353/31 |
| 8,328,362 | B2 * | 12/2012 | Coleman et al. | 353/20 |
| 2008/0225236 | A1 | 9/2008 | Schuck et al. | |
| 2009/0128780 | A1 * | 5/2009 | Schuck et al. | 353/20 |
| 2013/0169935 | A1 * | 7/2013 | Schuck et al. | 353/8 |
| 2013/0235284 | A1 * | 9/2013 | Schuck et al. | 349/8 |

FOREIGN PATENT DOCUMENTS

| CN | 1720723 | 1/2006 |
| CN | 101609249 | 12/2009 |
| TW | 200905361 | 2/2009 |

* cited by examiner

*Primary Examiner* — Tony Ko
(74) *Attorney, Agent, or Firm* — Kirton McConkie; Evan R. Witt

(57) ABSTRACT

A stereoscopic projection system includes an optical engine, a relay lens group, a polarization conversion system and two identical projection lenses. The optical engine is used for outputting a non-polarized image light. The non-polarized image light is imaged into the polarization conversion system through the relay lens group to produce an intermediate image. The polarization conversion system includes a polarization beam splitter, a polarization rotating element and a polarization switch. The polarization beam splitter is used for splitting the non-polarized image light into a first-state first polarized beam and a second-state second polarized beam, which have the same total optical length. By the polarization switch, the first output polarized beam and the second output polarized beam are alternately switched between the first state and the second state. The projection lenses are located in the first optical path and the second optical path for projecting the intermediate image.

9 Claims, 8 Drawing Sheets

POLARIZATION CONVERSION SYSTEM AND STEREOSCOPIC PROJECTION SYSTEM EMPLOYING SAME

CROSS-REFERENCE TO RELATED APPLICATION

This application claims the benefit of U.S. Provisional Application No. 61/380, 552 filed on Sep. 7, 2010, and entitled “POLARIZATION CONVERTIBLE STEREOSCOPIC PROJECTOR”, the entirety of which is hereby incorporated by reference.

FIELD OF THE INVENTION

The present invention relates to a stereoscopic projection system, and more particularly to a polarization-convertible stereoscopic projection system.

BACKGROUND OF THE INVENTION

With increasing development of three-dimensional (3D) imagery technology, various stereoscopic image products are gradually introduced into the market. In the conventional polarization conversion system, different images are received by the left eye and the right eye, and synthesized to a stereoscopic image.

In accordance with a current stereoscopic projection approach (e.g. an active approach), the user may wear liquid crystal shutter glasses to actively receive the stereoscopic image. The glass for the left eye and the glass for the right eye are turned on and turned off at different time spots, so that the stereoscopic image light is alternately directed to the left eye and the right eye. That is, the images with time difference are respectively received by the left eye and the right eye, and then synthesized to a stereoscopic image. However, this approach has some drawbacks. For example, the liquid crystal shutter glasses are bulky and heavy. In addition, it is inconvenient to periodically replace the battery of the liquid crystal shutter glasses.

In accordance with another stereoscopic projection approach (e.g. a passive approach), the stereoscopic image is passively received. That is, the stereoscopic image light is split into a P-polarized beam and an S-polarized beam. By wearing lightweight 3D image glasses with different polarizer plates allowing the image of one polarization to pass to the left eye and the image of the orthogonal polarization to pass to the right eye, different polarized beams (P-polarized beams and S-polarized beam) on the projection screen are synthesized to a stereoscopic image.

U.S. Pat. No. 7,857,455 discloses a stereoscopic projection system by combining a P-polarized beam and an S-polarized beam. FIG. 1 schematically illustrates a conventional stereoscopic projection system by combining a P-polarized beam and an S-polarized beam. As shown in FIG. 1, the stereoscopic projection system 1 comprises a polarization beam splitter 103 for receiving image light energy from a projection lens 102 and splitting the image light energy into a primary path and a secondary path. A reflective mirror 106 is located in the secondary path. In addition, a polarization modulator 104 is positioned in the primary path to rotate P-polarized beam into S-polarized beam, and another polarization modulator 105 is positioned in the secondary path for polarization rotation in the secondary path. After the light from a light source (not shown) is modulated by an imaging surface 101 and transmitted through the projection lens 102, the stereoscopic image light split into the primary path and the secondary path. A P-polarized beam 107 along the primary path is modulated by the polarization modulator 104. An S-polarized beam 108 along the secondary path is modulated by the polarization modulator 105, and reflected by the reflective mirror 106. In such way, the modulated P-polarized beam 107 and modulated S-polarized beam 108 are turned into the same polarization and projected on the same position of a projection screen 109.

Another polarization conversion system for a stereoscopic projection system is disclosed in U.S. Pat. No. 7,905,602. FIG. 2 schematically illustrates a conventional polarization conversion system for a stereoscopic projection system. The polarization conversion system (PCS) is included in the stereoscopic projection system 2. As shown in FIG. 2, the polarization conversion system comprises a polarization beam splitter (PBS) 202, a polarization rotating element 203, a reflective element 204 and a polarization switch 205. After the stereoscopic image light from a projection lens 201 is directed to the polarization conversion system, the stereoscopic image light is split by the polarization beam splitter 202 a P-polarized beam 206 and an S-polarized beam 207. The P-polarized beam 206 is directly transmitted through the polarization switch 205 along a first optical path. The S-polarized beam 207 is directed to the polarization rotating element 203 along a second optical path, and transformed into a P-polarized beam 208 by the polarization rotating element 203. The P-polarized beam 208 is reflected by the reflective element 204, and then transmitted through the polarization switch 205 along the second optical path. By the polarization switch 205, the polarized beams from the first optical path and the second optical path can be switched between the P-polarized beam and the S-polarized beam. Afterwards, the stereoscopic image light is directed toward a projection screen 209 along the first optical path and the second optical path, so that a brighter image is projected on the projection screen 209. Although the use of either the stereoscopic projection system 1 or the stereoscopic projection system 2 can achieve a brighter image output, there are still some drawbacks. For example, since the polarization conversion system is positioned downstream of the projection lens 201 and located where the image light is divergent, the polarization beam splitter 202, the polarization rotating element 203, the reflective element 204 and associated components are relatively bulky. Consequently, the overall volume of the polarization conversion system is large and the fabricating cost is increased. In addition, when the stereoscopic image light passes through the polarization beam splitter 202, the image quality is deteriorated.

SUMMARY OF THE INVENTION

The present invention provides a built-in polarization conversion system of a stereoscopic projection system.

The present invention also provides a stereoscopic projection system having a polarization conversion system and a relay lens group for splitting a non-polarized image light into two polarized beams with the same total optical length. In such way, the stereoscopic projection system is small-sized and has good imaging quality.

In accordance with an aspect of the present invention, there is provided a polarization conversion system. The polarization conversion system includes a polarization beam splitter, a polarization rotating element and a polarization switch. The polarization beam splitter is used for receiving a non-polarized image light from a relay lens group, and splitting the non-polarized image light into a first-state first polarized beam and a second-state second polarized beam. The first-state first polarized beam is propagated along a first optical path. The second-state second polarized beam is propagated along a second optical path. A total optical length of the first optical path is substantially equal to a total optical length of the second optical path. The polarization rotating element is located in the second optical path for transforming the second-state second polarized beam into a first-state second polarized beam. The polarization switch is used for receiving the first-state first polarized beam and the first-state second polarized beam, and selectively transforming the first-state first polarized beam and the first-state second polarized beam into a first output polarized beam and a second output polarized beam, so that the first output polarized beam and the second output polarized beam are alternately switched between the first state and the second state and respectively directed two identical projection lenses.

In accordance with another aspect of the present invention, there is provided a stereoscopic projection system. The stereoscopic projection system includes an optical engine, a relay lens group, a polarization conversion system and two identical projection lenses. The optical engine is used for outputting a non-polarized image light. The relay lens group is used for transmitting the non-polarized image light. The non-polarized image light is imaged into the polarization conversion system through the relay lens group to produce an intermediate image. The polarization conversion system includes a polarization beam splitter, a polarization rotating element and a polarization switch. The polarization beam splitter is used for receiving the non-polarized image light from the relay lens group, and splitting the non-polarized image light into a first-state first polarized beam and a second-state second polarized beam. The first-state first polarized beam is propagated along a first optical path. The second-state second polarized beam is propagated along a second optical path. A total optical length of the first optical path is substantially equal to a total optical length of the second optical path. The polarization rotating element is located in the second optical path for transforming the second-state second polarized beam into a first-state second polarized beam. The polarization switch is used for receiving the first-state first polarized beam and the first-state second polarized beam, and selectively transforming the first-state first polarized beam and the first-state second polarized beam into a first output polarized beam and a second output polarized beam, so that the first output polarized beam and the second output polarized beam are alternately switched between the first state and the second state. The two identical projection lenses are located in the first optical path and the second optical path for respectively receiving the first output polarized beam and the second output polarized beam. The intermediate image is projected onto a projection screen through the projection lenses.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
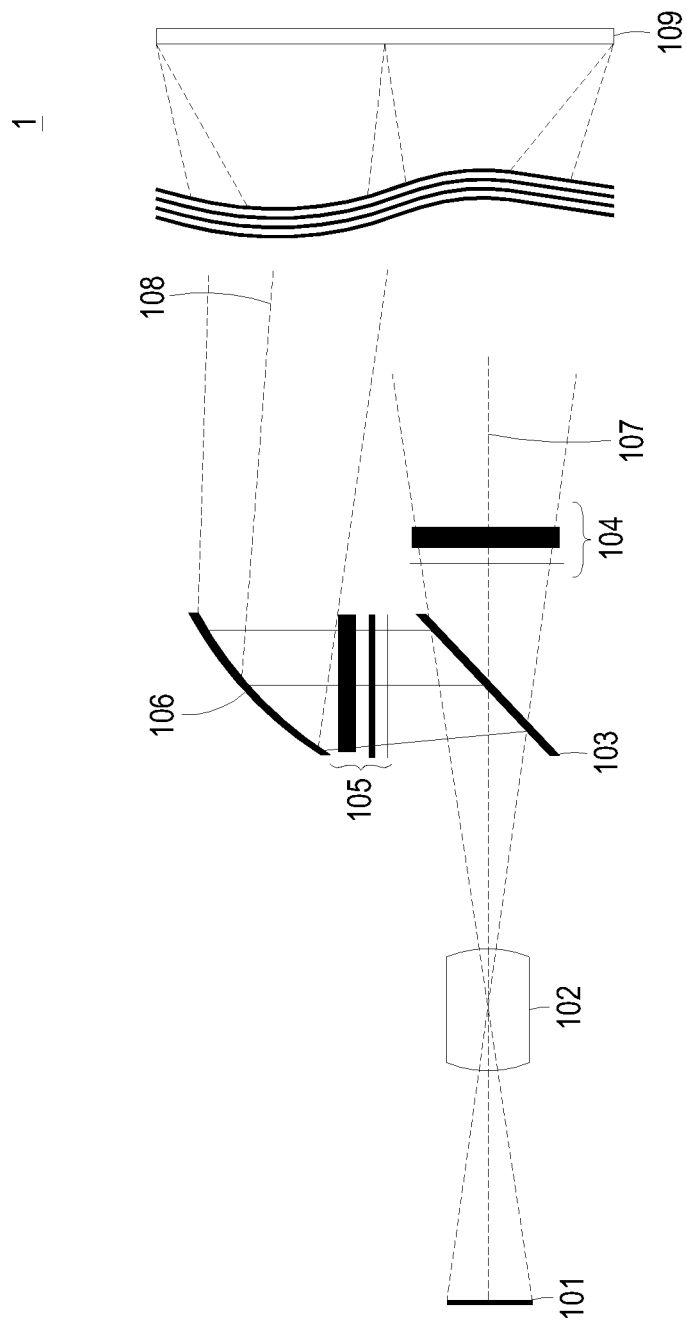
FIG. 1 schematically illustrates a conventional stereoscopic projection system by combining a P-polarized beam and an S-polarized beam.
Figure 2:
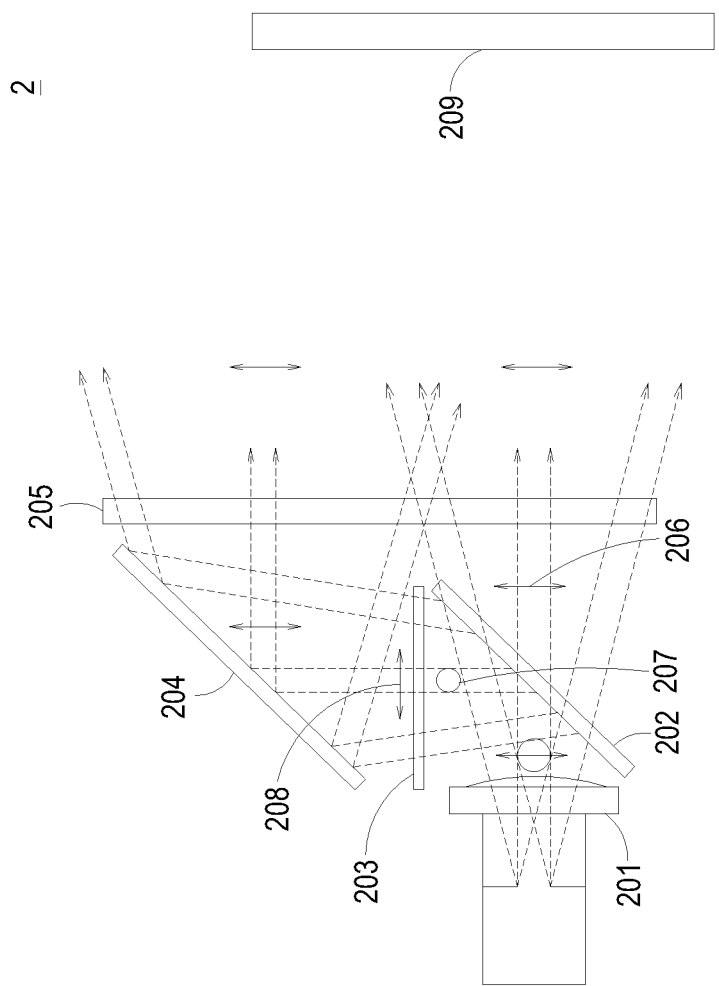
FIG. 2 schematically illustrates a conventional polarization conversion system for a stereoscopic projection system.
Figure 3A:
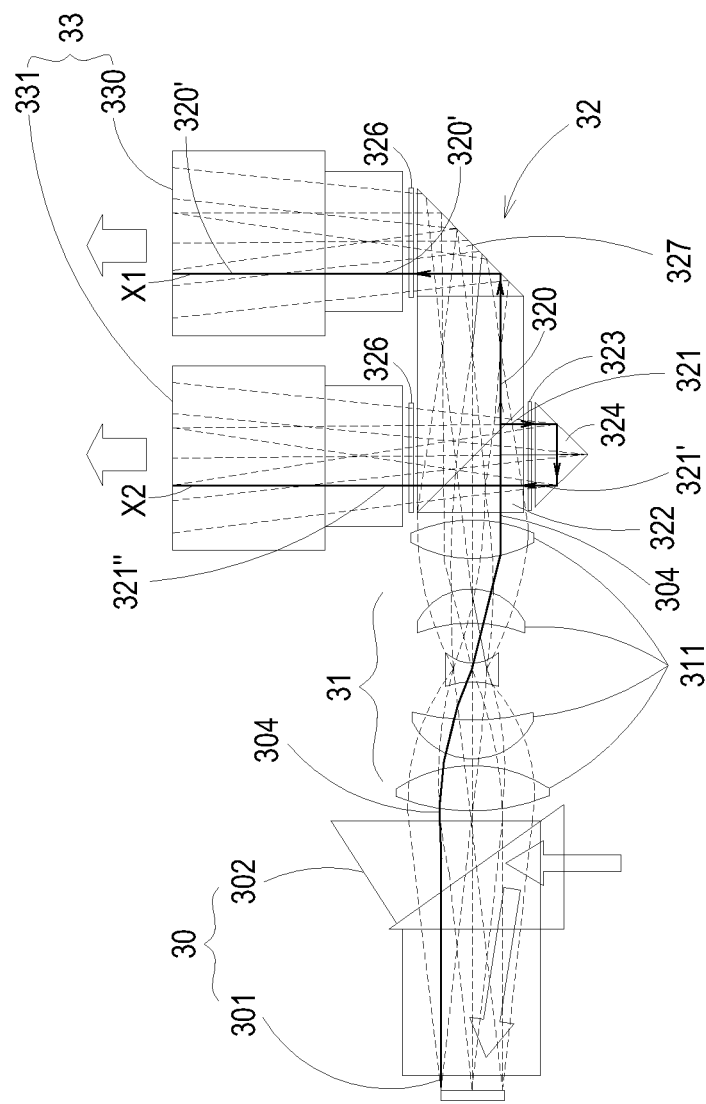
FIG. 3A schematically illustrates a stereoscopic projection system according to a first embodiment of the present invention.

FIG. 3A schematically illustrates a stereoscopic projection system according to a first embodiment of the present invention. As shown in FIG. 3A, the stereoscopic projection system 3 comprises an optical engine 30, a relay lens group 31, a polarization conversion system (PCS) 32 and projection lenses 33. The optical engine 30 comprises a digital micromirror device (DMD) 301, a total internal reflection prism (TIR prism) 302 and a Philip prism 303. The optical engine 30 is configured for outputting a non-polarized image light 304. In this embodiment, the digital micro-mirror device 301 is a one-piece or three-piece micro-display.

Figure 3B:
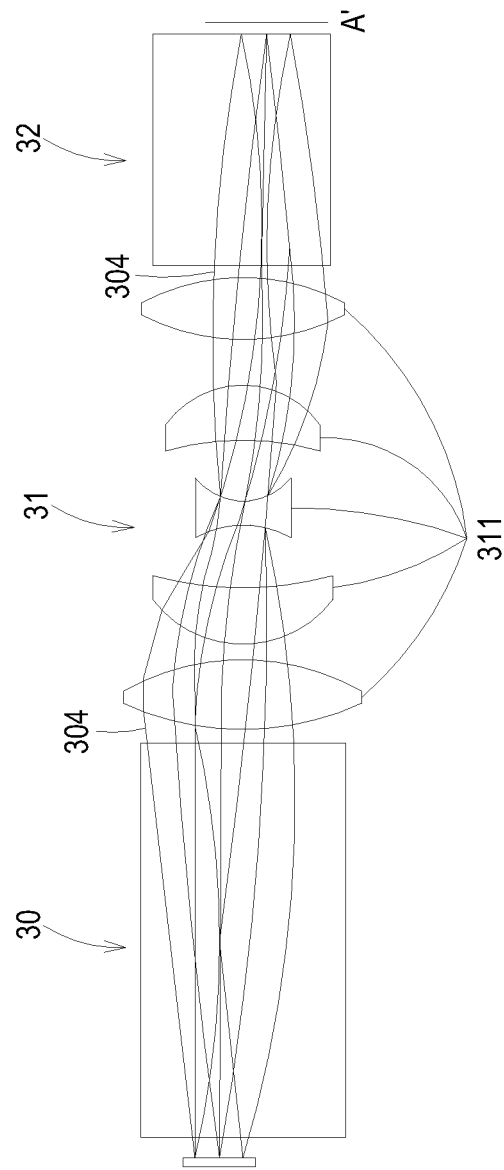
FIG. 3B schematically illustrates the relay lens group of the stereoscopic projection system as shown in FIG. 3A.

FIG. 3B schematically illustrates the relay lens group of the stereoscopic projection system as shown in FIG. 3A. After the non-polarized image light 304 is outputted from the optical engine 30, the optical engine 30 is directed to the relay lens group 31. As shown in FIGS. 3A and 3B, the relay lens group 31 comprises a plurality of lenses 311. In this embodiment, the relay lens group 31 is composed of five lenses 311, which are arranged in a line. By the relay lens group 31, the non-polarized image light 304 is imaged into the polarization conversion system 32 to produce an intermediate image A'. In addition, the non-polarized image light 304 is outputted to the polarization conversion system 32.

The polarization conversion system 32 is located between the relay lens group 31 and the projection lenses 33. In this embodiment, the polarization conversion system 32 comprises a polarization beam splitter (PBS) 322, a polarization rotating element 323, and a polarization switch 326. The polarization beam splitter 322 is used for receiving the non-polarized image light 304 from the relay lens group 31, and splitting the non-polarized image light 304 into a first polarized beam 320 and a second polarized beam 321. The first polarized beam 320, which is in a first state, is propagated along a first optical path X1. The second polarized beam 321, which is in a second state, is propagated along a second optical path X2. The total optical length of the first optical path X1 is substantially equal to the total optical length of the second optical path X2. In this embodiment, the first polarized beam 320 in the first state is a horizontally-polarized beam (i.e. a P-polarized beam), and the second polarized beam 321 in the second state is a vertically-polarized beam (i.e. an S-polarized beam).

Moreover, the polarization conversion system 32 further comprises a total reflection prism 327. The total reflection prism 327 is located in the first optical path X1 for changing the propagating direction of the first polarized beam 320, so that the first polarized beam 320 is directed toward the polarization switch 326. The polarization rotating element 323 is located in the second optical path X2. The second polarized beam 321 from the polarization beam splitter 322 is directed to the polarization rotating element 323 along the second optical path X2, so that the second polarized beam 321 in the second state is transformed into the first state by the polarization rotating element 323. That is, the S-polarized beam is transformed into a P-polarized beam 321' (i.e. the second polarized beam in the first state). Moreover, a Porro prism 324 is located in the second optical path X2 for changing the propagating direction of the P-polarized beam 321', so that the P-polarized beam 321' is directed toward the polarization switch 326. That is, the first polarized beam 320 and the second polarized beam 321', which are in the first state, can be directed toward the polarization switch 326 through the total reflection prism 327 (along the first optical path X1) and the Porro prism 324 (along the second optical path X2), respectively.

In this embodiment, the polarization rotating element 32 is a quarter-wave plate (¼λ). The polarization switch 326 is a one-piece or two-piece polarization switch, and located in the first optical path X1 and the second optical path X2. An example of the polarization switch 326 includes but is not limited to an optically compensated bend mode liquid crystal (π cell).

After the first-state first polarized beam 320 and the first-state second polarized beam 321' are received by the polarization switch 326, the first-state first polarized beam 320 and the first-state second polarized beam 321' are selectively transformed into a first output polarized beam 320' and a second output polarized beam 321" by the polarization switch 326. Consequently, the first output polarized beam 320' and the second output polarized beam 321" are simultaneously in either the first state or the second state. For example, if no voltage is applied to the polarization switch 326, the first output polarized beam 320' and the second output polarized beam 321" are simultaneously in the first state (i.e. P-polarized beams). Whereas, if a voltage is applied to the polarization switch 326, the first output polarized beam 320' and the second output polarized beam 321" are simultaneously in the second state (i.e. S-polarized beams). Due to the selective transformation of the polarization switch 326, the first output polarized beam 320' and the second output polarized beam 321" are alternately switched between the first state and the second state. In addition, two identical projection lenses 330 and 331 are located in the first optical path X1 and the second optical path X2, respectively. The projection lenses 330 and 331 are configured for receiving the first output polarized beam 320' and the second output polarized beam 321", and projecting the intermediate image A' on a projection screen (not shown). By wearing lightweight 3D image glasses with different polarizer plates allowing the image of one polarization to pass to the left eye and the image of the orthogonal polarization to pass to the right eye, different polarized beams (P-polarized beams and S-polarized beam) on the projection screen are synthesized to a stereoscopic image.

Since the polarization conversion system 32 is arranged in upstream of the projection lenses 33, the volume of the polarization beam splitter 322, the polarization rotating element 323 and the polarization switch 326 can be largely reduced. Moreover, since the polarization conversion system 32 is included in the stereoscopic projection system 3, the fabricating cost thereof is largely reduced and the overall volume thereof is decreased. Since the intermediate image A' is firstly produced through the relay lens group 31, the stereoscopic image shown on the projection screen is brighter and sharper, and the imaging quality thereof is enhanced.

Figure 4A:
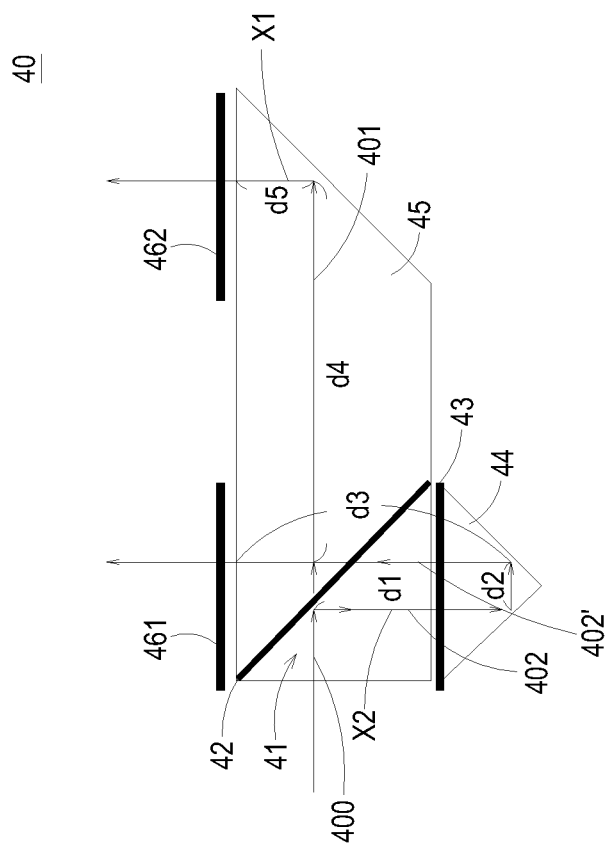
FIG. 4A schematically illustrates a polarization conversion system for a stereoscopic projection system according to a second embodiment of the present invention.

FIG. 4A schematically illustrates a stereoscopic projection system for a stereoscopic projection system according to a second embodiment of the present invention. As shown in FIG. 4A, the polarization beam splitter (PBS) of the polarization conversion system 40 comprises a right-angle prism 41, a PBS coating 42 and a dove prism 45. The PBS coating 42 is coated on the plane between the right-angle prism 41 and the dove prism 45. After a non-polarized image light 400 is directed into the polarization conversion system 40, the non-polarized image light 400 is split into a first polarized beam 401 and a second polarized beam 401 by the PBS coating 42. The first polarized beam 401, which is in a first state, is propagated along a first optical path X1. The second polarized beam 402, which is in a second state, is propagated along a second optical path X2. The first polarized beam 401 is transmitted through the dove prism 45, and then the propagating direction of the first polarized beam 401 is changed by the dove prism 45 and directed toward a polarization switch 462. The optical length of the first optical path X1 is equal to the sum of the optical paths d4 and d5 of the first polarized beam 401 passing through the dove prism 45. A polarization rotating element 43 is located in the second optical path X2. The second polarized beam 402 from the PBS coating 42 is directed to the polarization rotating element 43 along the second optical path X2, so that the second polarized beam 402 in the second state is transformed into the first state by the polarization rotating element 43. Moreover, a Porro prism 44 is located in the second optical path X2 for changing the propagating direction of the first-state second polarized beam 402', so that the first-state second polarized beam 402' is directed toward a polarization switch 461. The optical length of the second optical path X2 is equal to the sum of the optical paths d1, d2 and d3 of the second polarized beam 402 passing through the right-angle prism 41 and the Porro prism 44. In this embodiment, the total optical length of the first optical path X1 (i.e. d4+d5) is substantially equal to the total optical length of the second optical path X2 (d1+d2+d3).

Figure 4B:
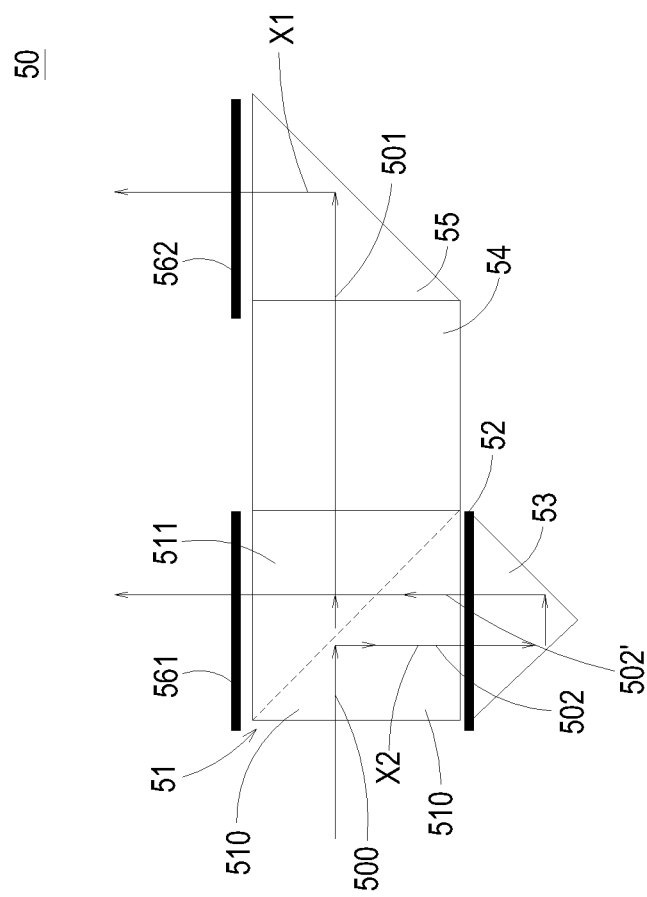
FIG. 4B schematically illustrates a polarization conversion system for a stereoscopic projection system according to a third embodiment of the present invention.

FIG. 4B schematically illustrates a polarization conversion system for a stereoscopic projection system according to a third embodiment of the present invention. As shown in FIG. 4B, the polarization beam splitter (PBS) of the polarization conversion system 50 comprises a PBS cube 51, a glass plate 54 and a total reflection prism 55. The PBS cube 51 is composed of two right-angle prisms 501 and 511. Similarly, after a non-polarized image light 500 is directed into the polarization conversion system 50, the non-polarized image light 500 is split into a first polarized beam 501 and a second polarized beam 502 by the PBS cube 51. The first polarized beam 501, which is in a first state, is propagated along a first optical path X1. The second polarized beam 502, which is in a second state, is propagated along a second optical path X2. The first polarized beam 501 is transmitted through the PBS cube 51, the glass plate 54 and the total reflection prism 55. The propagating direction of the first polarized beam 501 is changed by the total reflection prism 55 and directed toward a polarization switch 562. The optical length of the first optical path X1 is equal to the sum of the optical paths of the first polarized beam 501 passing through the PBS cube 51, the glass plate 54 and the total reflection prism 55. A polarization rotating element 52 is located in the second optical path X2. The second polarized beam 502 from the PBS cube 51 is directed to the polarization rotating element 52 along the second optical path X2, so that the second polarized beam 502 in the second state is transformed into the first state by the polarization rotating element 52. Moreover, a Porro prism 53 is located in the second optical path X2 for changing the propagating direction of the first-state second polarized beam 502', so that the first-state second polarized beam 502' is directed toward a polarization switch 561. The optical length of the second optical path X2 is equal to the sum of the optical paths of the second polarized beam 502 passing through the PBS cube 51 and the Porro prism 53. In this embodiment, the total optical length of the first optical path X1 is substantially equal to the total optical length of the second optical path X2.

Figure 4C:
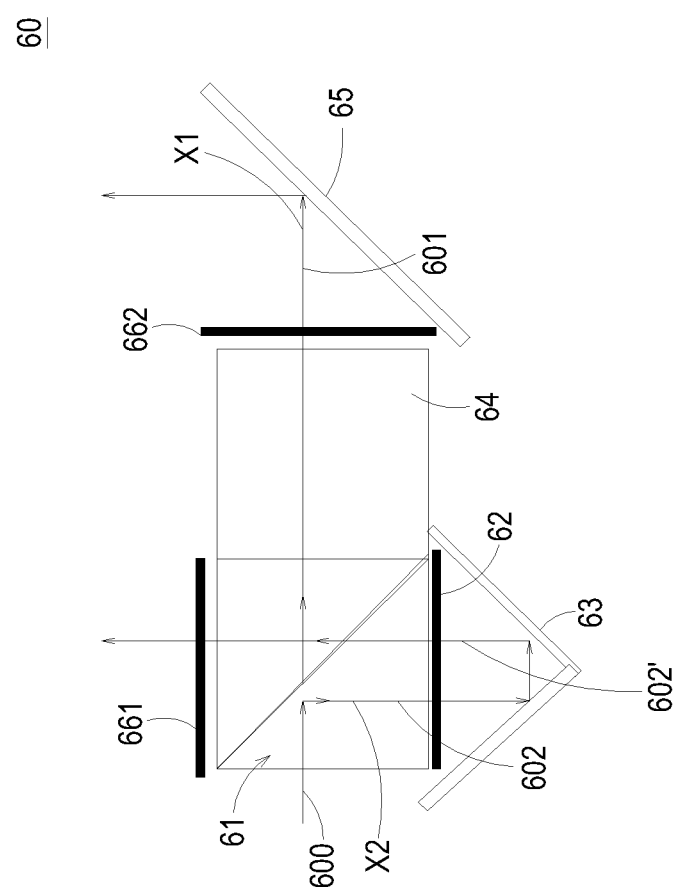
FIG. 4C schematically illustrates a polarization conversion system for a stereoscopic projection system according to a fourth embodiment of the present invention.

FIG. 4C schematically illustrates a polarization conversion system for a stereoscopic projection system according to a fourth embodiment of the present invention. As shown in FIG. 4C, the polarization beam splitter (PBS) of the polarization conversion system 60 comprises a PBS cube 61, a glass plate 64 and a fold mirror 65. The total reflection prism used in the stereoscopic projection system of the third embodiment is replaced by the fold mirror 65. That is, the fold mirror 65 is configured for changing the propagating direction of the first polarized beam 601, so that the first polarized beam 601 is directed to the polarization switch 662. After a non-polarized image light 600 is directed into the polarization conversion system 60, the non-polarized image light 600 is split into a first polarized beam 601 and a second polarized beam 602 by the PBS cube 61. Similarly, the second polarized beam 602 in the second state is transformed into a first-state second polarized beam 602' by the polarization rotating element 62. In addition, the Porro prism 53 used in the stereoscopic projection system of the third embodiment is replaced by two Porro mirrors 63. That is, the Porro mirrors 63 are used for changing the propagating direction of the first-state second polarized beam 602', so that the first-state second polarized beam 602' is directed toward a polarization switch 661. The polarization switch 662 is located in the first optical path X1. Except that the polarization switch 662 is arranged between the glass plate 64 and the fold mirror 65, the functions of the polarization switch 662 are similar to those of the above embodiments, and are not redundantly described herein. In this embodiment, the polarization rotating element 62 is a quarter-wave plate (¼λ). An example of the polarization switch 661 or 662 includes but is not limited to an optically compensated bend mode liquid crystal (π cell). Moreover, the total optical length of the first optical path X1 is substantially equal to the total optical length of the second optical path X2.

Figure 4D:
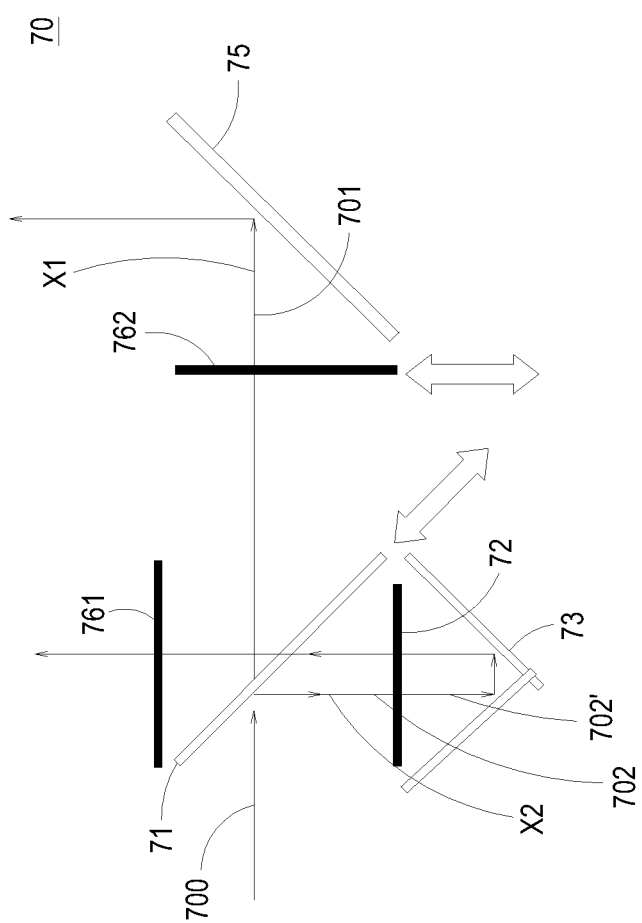
FIG. 4D schematically illustrates a polarization conversion system for a stereoscopic projection system according to a fifth embodiment of the present invention.

FIG. 4D schematically illustrates a polarization conversion system for a stereoscopic projection system according to a fifth embodiment of the present invention. As shown in FIG. 4D, the polarization beam splitter (PBS) of the polarization conversion system 70 is a wire-grid PBS 71. After a non-polarized image light 700 is directed into the polarization conversion system 70, the non-polarized image light 700 is split into a first polarized beam 701 in a first state and a second polarized beam 702 in a second state by the wire-grid PBS 71. Similarly, the second polarized beam 702 in the second state is transformed into a first-state second polarized beam 702' by the polarization rotating element 72. The fold mirror 75 is located in the first optical path for changing the propagating direction of the first polarized beam 701, so that the first polarized beam 701 is directed to the polarization switch 762. In addition, two Porro mirrors 73 are located in the second optical path X2 for changing the propagating direction of the first-state second polarized beam 702', so that the first-state second polarized beam 702' is directed toward a polarization switch 761. In other words, the first-state first polarized beam 701 and the first-state second polarized beam 702' are directed to the same direction by the fold mirror 75 and the Porro mirrors 73, respectively. The polarization switch 762 is located in the first optical path X1. Except that the polarization switch 762 is arranged between the wire-grid PBS 71 and the fold mirror 75, the functions of the polarization switch 762 are similar to those of the above embodiments, and are not redundantly described herein. In this embodiment, the polarization rotating element 72 is a quarter-wave plate (¼λ). An example of the polarization switch 761 or 762 includes but is not limited to an optically compensated bend mode liquid crystal (π cell). Moreover, the total optical length of the first optical path X1 is substantially equal to the total optical length of the second optical path X2.

In the above embodiments, the polarization beam splitter (PBS) of the polarization conversion system may have diversified configurations, for example a combination of a right-angle prism, a PBS coating and a dove prism, a combination of a PBS cube, a glass plate and a total reflection prism, a combination of a PBS cube, a glass plate and a fold mirror, or a wire-grid PBS. Moreover, the location of the polarization switch is not restricted. As long as the polarization conversion system is arranged between the relay lens group and the projection lenses and the total optical length of the first optical path is substantially equal to the total optical length of the second optical path, numerous modifications of the optical components and the arrangements thereof may be made.

From the above description, the stereoscopic projection system of the present invention comprises an optical engine, a relay lens group, a polarization conversion system and two identical projection lenses, which are sequentially and optically coupled with each other. Since polarization conversion system is arranged between the polarization conversion system and the identical projection lenses to split a non-polarized image light into a first-state first polarized beam and a second-state second polarized beam with the same total optical length, the stereoscopic projection system is small-sized and has good imaging quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A polarization conversion system, comprising:
    a polarization beam splitter for receiving a non-polarized image light from a relay lens group, and splitting said non-polarized image light into a first-state first polarized beam and a second-state second polarized beam, wherein said first-state first polarized beam is propagated along a first optical path, and said second-state second polarized beam is propagated along a second optical path, wherein a total optical length of said first optical path is substantially equal to a total optical length of said second optical path;
    a polarization rotating element located in said second optical path for transforming said second-state second polarized beam into a first-state second polarized beam; and
    a polarization switch for receiving said first-state first polarized beam and said first-state second polarized beam, and selectively transforming said first-state first polarized beam and said first-state second polarized beam into a first output polarized beam and a second output polarized beam, so that said first output polarized beam and said second output polarized beam are alternately switched between said first state and said second state and respectively directed two identical projection lenses.

2. The polarization conversion system according to claim 1 further comprising a total reflection prism in said first optical path and a Porro prism in the second optical path for respectively directing said first-state first polarized beam and said first-state second polarized beam to the same direction.

3. The polarization conversion system according to claim 1 wherein said polarization rotating element is a quarter-wave plate, and said polarization switch is an optically compensated bend mode liquid crystal (π cell).

4. The polarization conversion system according to claim 1 wherein said polarization beam splitter comprises a right-angle prism, a polarization beam splitter coating and a dove prism, wherein said polarization beam splitter coating is coated on a plane between said right-angle prism and said dove prism.

5. The polarization conversion system according to claim 1 wherein said polarization beam splitter comprises a polarization beam splitter cube, a glass plate and a total reflection prism, wherein said polarization beam splitter cube is composed of two right-angle prisms.

6. The polarization conversion system according to claim 1 wherein said polarization beam splitter comprises a polarization beam splitter cube, a glass plate and a fold mirror, wherein a fold mirror is located in said first optical path and a Porro mirror is located in the second optical path for respectively directing said first-state first polarized beam and said first-state second polarized beam to the same direction.

7. The polarization conversion system according to claim 1 wherein said polarization beam splitter is a wire-grid polarization beam splitter, wherein a fold mirror is located in said first optical path and a Porro mirror is located in the second optical path for respectively directing said first-state first polarized beam and said first-state second polarized beam to the same direction.

8. A stereoscopic projection system, comprising:
an optical engine for outputting a non-polarized image light;
a relay lens group for transmitting said non-polarized image light;
a polarization conversion system, wherein said non-polarized image light is imaged into said polarization conversion system through said relay lens group to produce an intermediate image, and said polarization conversion system comprises:
a polarization beam splitter for receiving said non-polarized image light from said relay lens group, and splitting said non-polarized image light into a first-state first polarized beam and a second-state second polarized beam, wherein said first-state first polarized beam is propagated along a first optical path, and said second-state second polarized beam is propagated along a second optical path, wherein a total optical length of said first optical path is substantially equal to a total optical length of said second optical path;
a polarization rotating element located in said second optical path for transforming said second-state second polarized beam into a first-state second polarized beam; and
a polarization switch for receiving said first-state first polarized beam and said first-state second polarized beam, and selectively transforming said first-state first polarized beam and said first-state second polarized beam into a first output polarized beam and a second output polarized beam, so that said first output polarized beam and said second output polarized beam are alternately switched between said first state and said second state; and
two identical projection lenses located in said first optical path and said second optical path for respectively receiving said first output polarized beam and said second output polarized beam, wherein said intermediate image is projected onto a projection screen through said projection lenses.

9. The stereoscopic projection system according to claim 8 wherein said optical engine comprises a digital micro-mirror device, a total internal reflection prism and a Philip prism.

* * * * *